United States Patent
Asuncion et al.

(10) Patent No.: US 10,794,762 B2
(45) Date of Patent: Oct. 6, 2020

(54) METHOD FOR AMBIENT LIGHT SUBTRACTION

(71) Applicant: LITE-ON SINGAPORE PTE. LTD., Midview (SG)

(72) Inventors: John Julius De Leon Asuncion, Singapore (SG); Prabakaran Chinnusamy, Singapore (SG); Tong-Tee Tan, Singapore (SG)

(73) Assignee: LITE-ON SINGAPORE PTE. LTD., Midview (SG)

(*) Notice: Subject to any disclaimer, the term of this patent is extended or adjusted under 35 U.S.C. 154(b) by 181 days.

(21) Appl. No.: 16/211,442

(22) Filed: Dec. 6, 2018

(65) Prior Publication Data
US 2020/0182690 A1  Jun. 11, 2020

(51) Int. Cl.
*G01J 1/44* (2006.01)

(52) U.S. Cl.
CPC ........... *G01J 1/44* (2013.01); *G01J 2001/444* (2013.01)

(58) Field of Classification Search
CPC .............................. G01J 1/44; G01J 2001/444
See application file for complete search history.

(56) References Cited

U.S. PATENT DOCUMENTS

| | | | |
|---|---|---|---|
| 2011/0248151 A1* | 10/2011 | Holcombe | G01J 1/44 250/221 |
| 2012/0049048 A1* | 3/2012 | Dyer | G01J 1/44 250/214 AL |

* cited by examiner

*Primary Examiner* — Georgia Y Epps
*Assistant Examiner* — Don J Williams
(74) *Attorney, Agent, or Firm* — Li & Cai Intellectual Property (USA) Office

(57) ABSTRACT

A method for ambient light subtraction providing a sensor having an emitter, a receiver, and a processor; performing a first sampling process, during which the emitter does not emit signals, the receiver receives a first ambient light signal converted into a first data set by the processor; performing a second sampling process, during which the emitter emits a detecting signal, the receiver receives a second ambient light signal and the detecting signal converted into a second data set by the processor; performing a third sampling process, during which the emitter does not emit signals, the receiver receives a third ambient light signal converted into a third data set by the processor; deriving an average value by calculating the average of the first data set and the third data set; and deriving a difference value by calculating the difference between the second data set and the average value.

13 Claims, 3 Drawing Sheets

METHOD FOR AMBIENT LIGHT SUBTRACTION

BACKGROUND OF THE INVENTION

1. Field of the Invention

The present disclosure relates to a method for noise filtering; more particularly, to a method for ambient light subtraction.

2. Description of Related Art

Active sensors detect the existence of nearby objects without actual contact. When in operation, an emitter in the sensor radiates an electromagnetic field or electromagnetic waves, while a detector in the sensor detects the variation in electromagnetic energy or receives the electromagnetic waves reflected by an object.

Active sensors are widely used; for example, proximity sensors are often applied to smartphones. The proximity sensor detects the ear, face and hair of a user when a phone call is going on, and suspends touch control function accordingly so as to prevent an accidental touch from disrupting the call. Moreover, a proximity sensor can also be applied to parking lot entrances/exits, transportation devices or monitors to sense the vibration of components therein.

Without complex structure, mechanical parts and actual contact with objects to be detected, proximity sensors are reliable and durable. However, ambient light, which is a kind of electromagnetic wave, exists in almost every environment where detection is performed, which lowers the sensitivity of the sensor, prompts a saturation current in the receiver or changes the reflectivity of the objects to be detected, consequently reducing the efficacy of proximity sensors.

SUMMARY OF THE INVENTION

Accordingly, one of the objectives of the present disclosure is to provide a method for ambient light subtraction, which performs ambient light detection before and after detecting an object, calculates the average value of the data derived from the ambient light detection, and subtracts the average value from the data derived by the detection of the object.

To achieve the above described purpose, one embodiment of the present disclosure provides a method for ambient light subtraction. The method includes: providing a sensor including an emitter, a receiver, and a processor; performing a first sampling process, during which the emitter does not emit signals, the receiver receives a first ambient light signal, which is converted into a first data set by the processor; performing a second sampling process, during which the emitter emits a detecting signal, and the receiver receives a second ambient light signal and the detecting signal, which is converted into a second data set by the processor; performing a third sampling process, during which the emitter does not emit signals, and the receiver receives a third ambient light signal, which is converted into a third data set by the processor; deriving an average value by calculating the average of the first data set and the third data set; and deriving a difference value by calculating the difference between the second data set and the average value.

The present disclosure is advantageous in that the method for ambient light subtraction derives an average value by calculating the average of the first data set and the third data set, and a difference value by calculating the difference between the second data set and the average value after performing a first sampling process, during which the emitter does not emit signals, the receiver receives a first ambient light signal, which is converted into a first data set by the processor; performing a second sampling process, during which the emitter emits a detecting signal, and the receiver receives a second ambient light signal and the detecting signal, which is converted into a second data set by the processor; and performing a third sampling process, during which the emitter does not emit signals, and the receiver receives a third ambient light signal, which is converted into a third data set by the processor.

For the further understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are for the purpose of further explaining the scope of the present disclosure. Other objectives and advantages related to the present disclosure will be illustrated in the following description and appended drawings.

Figure 1:
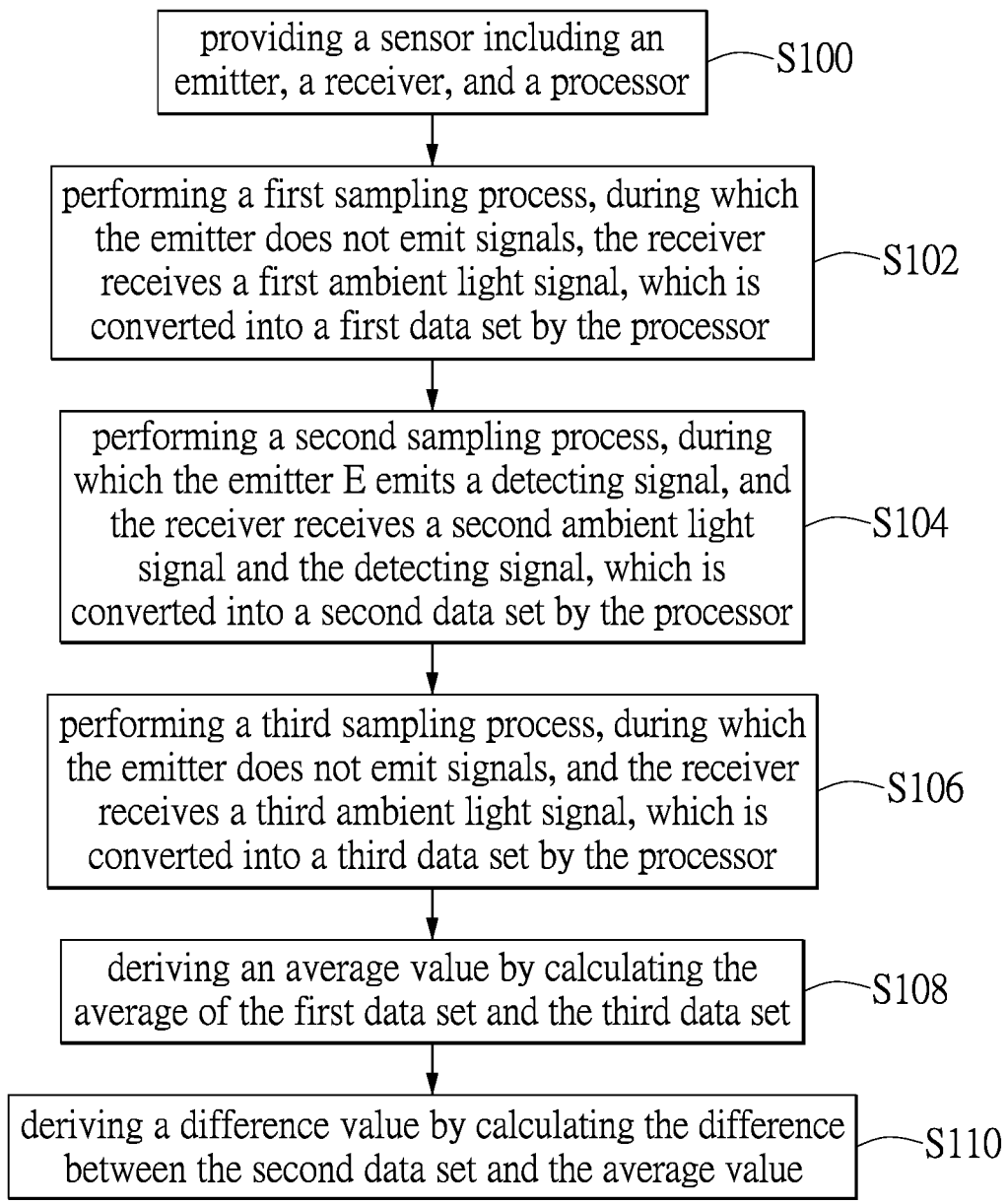
FIG. 1 is a flow chart illustrating a method for ambient light subtraction according to the embodiment of the present disclosure.
Figure 2:
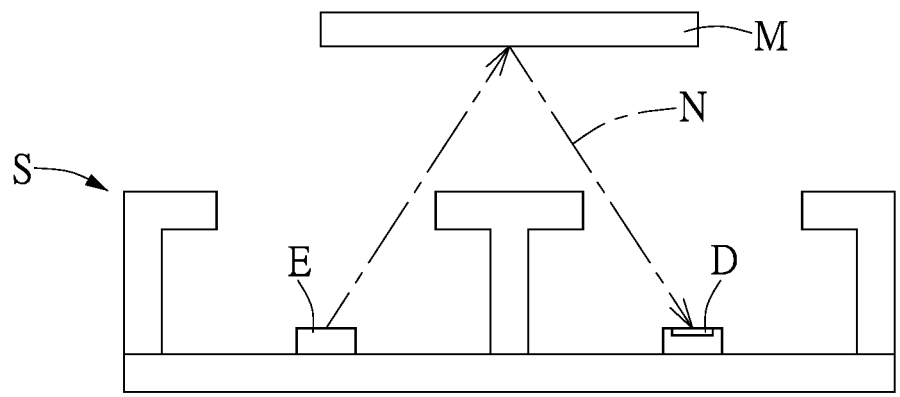
FIG. 2 is a sectional schematic view illustrating a sensor provided by the method for ambient light subtraction according to the embodiment of the present disclosure.
Figure 3:
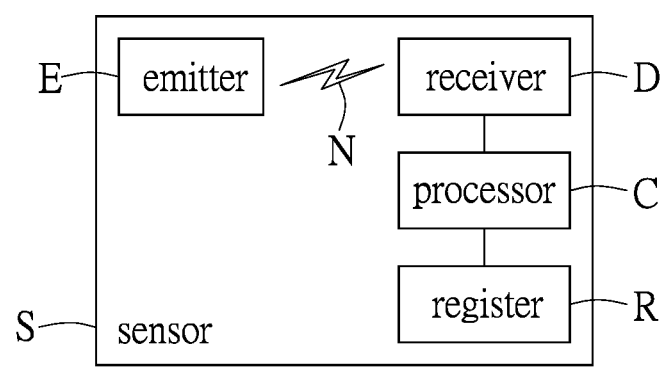
FIG. 3 is a function block diagram illustrating the sensor provided by the method for ambient light subtraction according to the embodiment of the present disclosure.

Referring to FIGS. 1 to 3, the method for ambient light subtraction of the present disclosure includes a step S100 of providing a sensor S including an emitter E, a receiver D, and a processor C. The types of the sensor S, the emitter E and the receiver D are not limited in the present disclosure. In this embodiment, the sensor S, the emitter E and the receiver D are exemplified as a proximity sensor, a light-emitting diode and a photodiode respectively, in which the photodiode emits a detecting signal N, which is reflected by an object M and received by the photodiode. However, in other embodiments, the sensor S and the receiver D can also be other types of active sensors and receivers, and the emitter E can be another kind of light-emitting device, e.g. a laser emitter.

Next, the method for ambient light subtraction of the present disclosure further includes a step S102 of performing a first sampling process, during which the emitter E does not emit signals, the receiver D receives a first ambient light signal, which is converted into a first data set by the processor C; a step S104 of performing a second sampling process, during which the emitter E emits a detecting signal N, and the receiver D receives a second ambient light signal and the detecting signal N, which is converted into a second data set by the processor C; a step S106 of performing a third sampling process, during which the emitter E does not emit signals, and the receiver D receives a third ambient light signal, which is converted into a third data set by the processor C.

Specifically, the first sampling process, the second sampling process and the third sampling process are performed in sequence, that is to say, the sensor S performs a sampling process to collect ambient light signals before and after the emitter E emits the detecting signal N to detect the object. More specifically, the detecting signal N is a signal emitted by the emitter E, reflected by the object to be detected M, and then received by the receiver D. The receiver D determines whether an object near the sensor S exists by analyzing the data that it receives.

Next, the method for ambient light subtraction further includes a step S108 of deriving an average value by calculating the average of the first data set and the third data set; a step S110 of deriving a difference value by calculating the difference between the second data set and the average value. By calculating the average value of the first data set and the third date set and subtracting the average value from the second data set, the method for ambient light subtraction provided by the present disclosure can effectively remove the effect of ambient light.

The method for filtering ambient light in the prior art performs two sampling processes, in which the emitter does not emit detecting signals during the first sampling process and then emits detecting signals during the second sampling process so that the data set derived from the second sampling process includes ambient light signals and detecting signals. A difference between the first data set and the second data set is then derived so as to eliminate the interference of ambient light. However, this method has limited effect due to the mismatch of signals caused by flicker noise.

Specifically, flicker noise takes the major part of ambient light that affects sensors. The method for ambient light subtraction of the present disclosure can eliminate 90% of flicker noise, thus reducing the interference thereof.

Moreover, in the present embodiment, the processor C is an analog-to-digital converter, which performs the calculation of the aforementioned average value and difference value. However, the present disclosure is not limited thereto. In other embodiments, the processor C can be one of other types of analog signal processors.

Furthermore, in the present embodiment, when the detecting signal N enters the proximity sensor and arrives on the photodiode, the signal photons prompt electrons and holes to recombine, thus resulting in the photoelectric effect and generating photoelectric current. The photoelectric current is then converted into an analog signal in AC current, which is then outputted to the analog-to-digital converter. Afterwards, the analog-to-digital converter converts the analog signal into a digital signal.

The present disclosure does not limit the method adopted to convert the photoelectric current into an analog signal and convert the analog signal into the digital signal. For instance, the conversion can be a Fourier transform. People skilled in the art can choose the way of converting the signals according to actual needs.

Moreover, the sensor S can further include a register R. The processor C converts the first ambient light signal, the second ambient light signal and the third ambient light signal into the first data set, the second data set and the third data set respectively according to sampling-number information and pulse-number information stored in the register.

More specifically, regarding the sampling number information, one sampling includes three sampling processes. In other words, in a sampling, a first data set is derived during the first sampling process, a second data set is derived during the second sampling process, and a third data set is derived during the third sampling process. Furthermore, the pulse-number information refers to the total pulse number within the distance from the sensor S to the object M to be detected. In accordance with the sampling-number information and the pulse-number information, the first ambient light signal, the second ambient light signal and the third ambient light signal are integrated into the first data set, the second data set and the third data set that can be processed.

Figure 4:
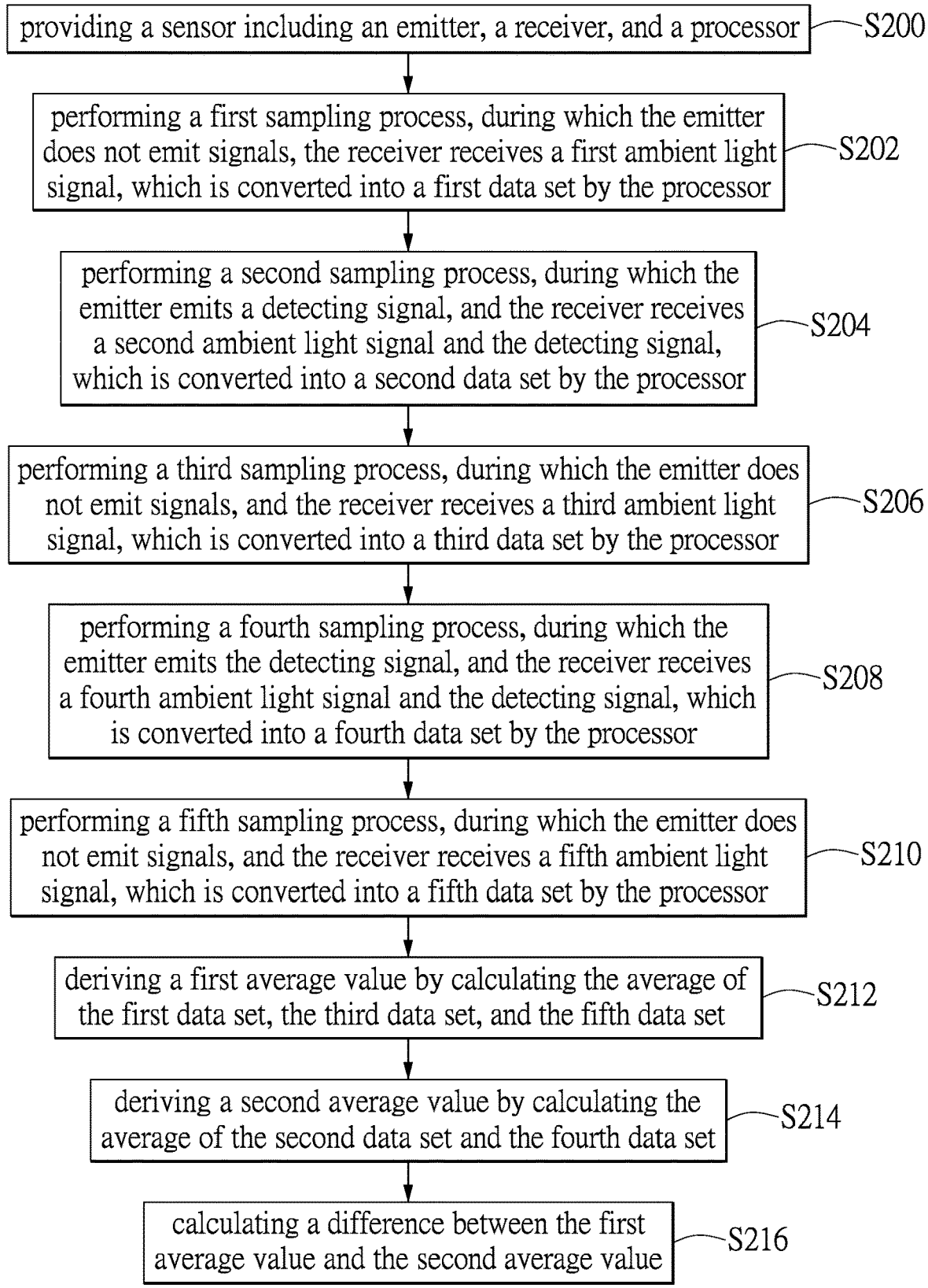
FIG. 4 is a flow chart illustrating a method for ambient light subtraction according to a different embodiment of the present disclosure.

In a different embodiment, with reference to FIG. 4, the method for ambient light subtraction of the present disclosure includes following steps. In step S200, a sensor S is provided and includes an emitter E, a receiver D, and a processor C. In step S202, a first sampling process is performed, during which the emitter E does not emit signals, the receiver D receives a first ambient light signal, which is converted into a first data set by the processor C. In step S204, a second sampling process is performed, during which the emitter E emits a detecting signal N, and the receiver D receives a second ambient light signal and the detecting signal N, which is converted into a second data set by the processor C. In step S206, a third sampling process is performed, during which the emitter E does not emit signals, and the receiver D receives a third ambient light signal, which is converted into a third data set by the processor C. In step S208, a fourth sampling process is performed, during which the emitter E emits the detecting signal N, and the receiver D receives the fourth ambient light signal and the detecting signal N, which is converted into a fourth data set by the processor C. In step S210, a fifth sampling process is performed, during which the emitter E does not emit signals, and the receiver D receives a fifth ambient light signal, which is converted into a fifth data set by the processor C.

Specifically, the first sampling process, the second sampling process, the third sampling process, the fourth sampling process and the fifth sampling process are performed when the total number of the pulse-number information is equal to 1 (Npulse=1). In other words, at the distance between the sensor S and the object M, there are five sampling processes in one sampling.

Next, the method for ambient light subtraction further includes a step S212 of deriving a first average value by calculating the average of the first data set, the third data set and the fifth data set, a step S214 of deriving a second average value by calculating the average of the second data set and the fourth data set, and a step S216 of calculating a difference between the first average value and the second average value. By calculating the difference between the first average value and the second average value, the method for ambient light subtraction provided by the present disclosure can effectively remove the effect of ambient light.

The present disclosure is advantageous in that the method for ambient light subtraction derives an average value by calculating the average of the first data set and the third data set, and a difference value by calculating the difference between the second data set and the average value after performing a first sampling process, during which the emitter does not emit signals, the receiver receives a first ambient light signal, which is converted into a first data set by the processor; performing a second sampling process, during which the emitter emits a detecting signal, and the receiver receives a second ambient light signal and the detecting signal, which is converted into a second data set by the processor; and performing a third sampling process, during which the emitter does not emit signals, and the receiver receives a third ambient light signal, which is converted into a third data set by the processor. In a different embodiment, five pieces of data are acquired by five sampling processes. The first average value is calculated among the first data, the third data and the fifth data. The second average value is calculated among the second data and the fourth data, and then the difference value between the first average data and the second average data is acquired. Accordingly, the method for ambient light subtraction of the present disclosure is capable of reducing 90% flicker noise and efficiently minimizing the interference of the ambient light in the sensor S.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A method for ambient light subtraction, comprising:
providing a sensor including an emitter, a receiver, and a processor;
performing a first sampling process, during which the emitter does not emit signals, the receiver receives a first ambient light signal, which is converted into a first data set by the processor;
performing a second sampling process, during which the emitter emits a detecting signal, and the receiver receives a second ambient light signal and the detecting signal, which is converted into a second data set by the processor;
performing a third sampling process, during which the emitter does not emit signals, and the receiver receives a third ambient light signal, which is converted into a third data set by the processor;
deriving an average value by calculating the average of the first data set and the third data set; and
deriving a difference value by calculating the difference between the second data set and the average value.

2. The method according to claim 1, wherein the processor is an analog-to-digital converter.

3. The method according to claim 2, wherein the average value and the difference value are calculated by the analog-to-digital converter.

4. The method according to claim 2, wherein the sensor further includes a register.

5. The method according to claim 4, wherein the analog-to-digital converter converts the first ambient light signal into the first data set according to sampling-number information and pulse-number information stored in the register.

6. The method according to claim 4, wherein the analog-to-digital converter converts the second ambient light signal into the second data set according to sampling-number information and pulse-number information stored in the register.

7. The method according to claim 4, wherein the analog-to-digital converter converts the third ambient light signal into the third data set according to sampling-number information and pulse-number information stored in the register.

8. The method according to claim 1, wherein the sensor is a proximity sensor.

9. The method according to claim 1, wherein the emitter is a light-emitting diode.

10. The method according to claim 1, wherein the receiver is a photodiode.

11. A method for ambient light subtraction, comprising:
providing a sensor including an emitter, a receiver, and a processor;
performing a first sampling process, during which the emitter does not emit signals, the receiver receives a first ambient light signal, which is converted into a first data set by the processor;
performing a second sampling process, during which the emitter emits a detecting signal, and the receiver receives a second ambient light signal and the detecting signal, which is converted into a second data set by the processor;
performing a third sampling process, during which the emitter does not emit signals, and the receiver receives a third ambient light signal, which is converted into a third data set by the processor;
performing a fourth sampling process, during which the emitter emits the detecting signal, and the receiver receives a fourth ambient light signal and the detecting signal, which is converted into a fourth data set by the processor;
performing a fifth sampling process, during which the emitter does not emit signals, and the receiver receives a fifth ambient light signal, which is converted into a fifth data set by the processor;
deriving a first average value by calculating the average of the first data set, the third data set, and the fifth data set;
deriving a second average value by calculating the average of the second data set and the fourth data set; and
calculating a difference between the first average value and the second average value.

12. The method according to claim 11, wherein the first sampling process, the second sampling process, the third sampling process, the fourth sampling process and the fifth sampling process are performed within one sampling.

13. The method according to claim 11, wherein the first sampling process, the second sampling process, the third sampling process, the fourth sampling process and the fifth sampling process are performed at a distance between the sensor and a testing object.

* * * * *